May 12, 1942.    I. E. DE SHERBININ    2,282,947
STEREOSCOPIC PHOTOGRAPHY AND PROJECTION
Filed May 1, 1939    4 Sheets-Sheet 2

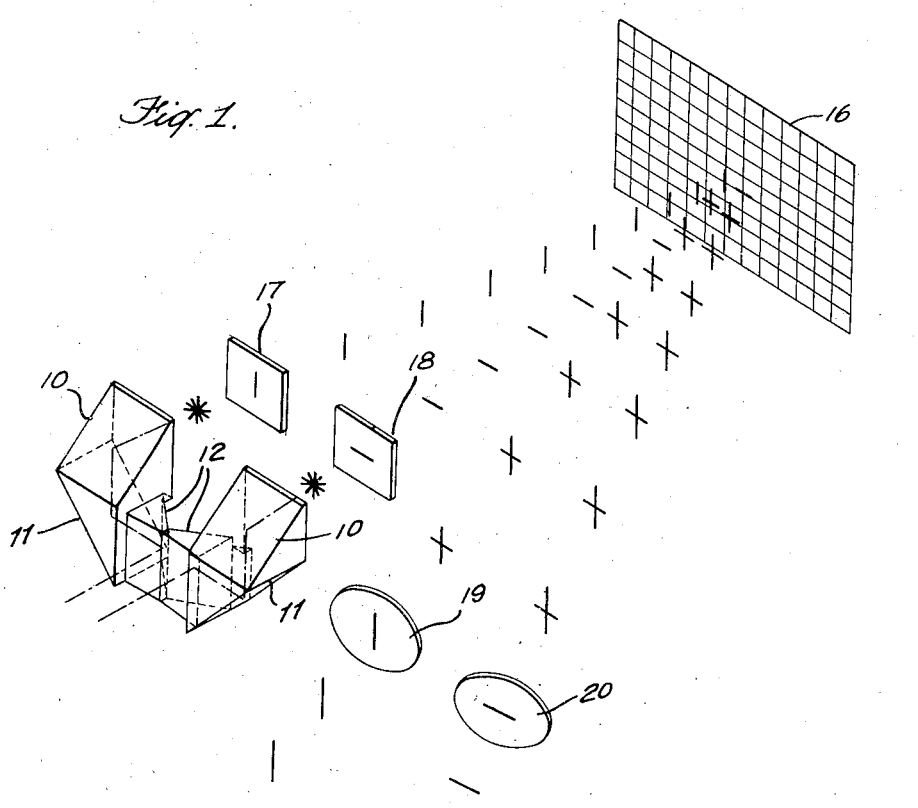
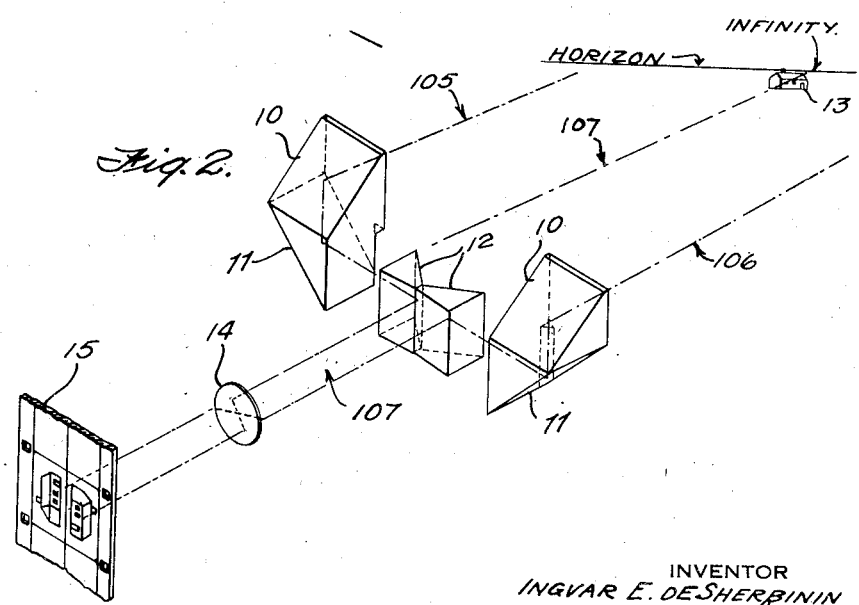

INVENTOR
INGVAR E. DE SHERBININ
BY
ATTORNEY

May 12, 1942.  I. E. DE SHERBININ  2,282,947
STEREOSCOPIC PHOTOGRAPHY AND PROJECTION
Filed May 1, 1939  4 Sheets-Sheet 3

INVENTOR
INGVAR E. DE SHERBININ.
BY
ATTORNEY

May 12, 1942.   I. E. DE SHERBININ   2,282,947
STEREOSCOPIC PHOTOGRAPHY AND PROJECTION
Filed May 1, 1939   4 Sheets-Sheet 4
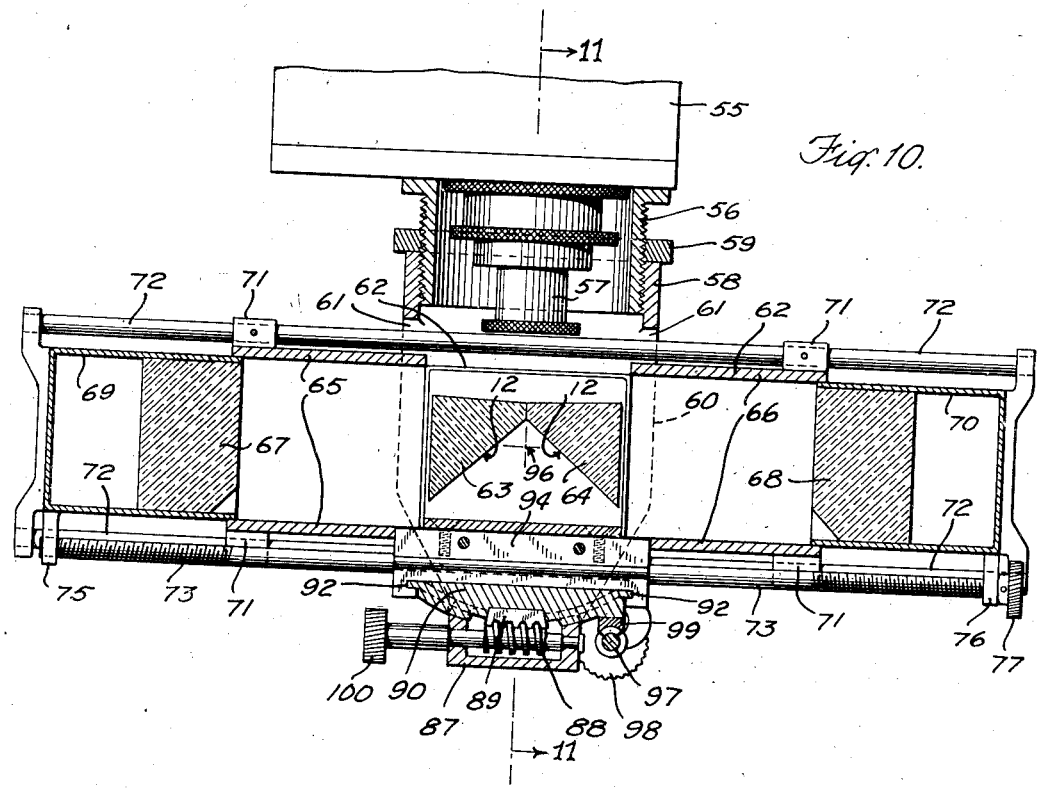
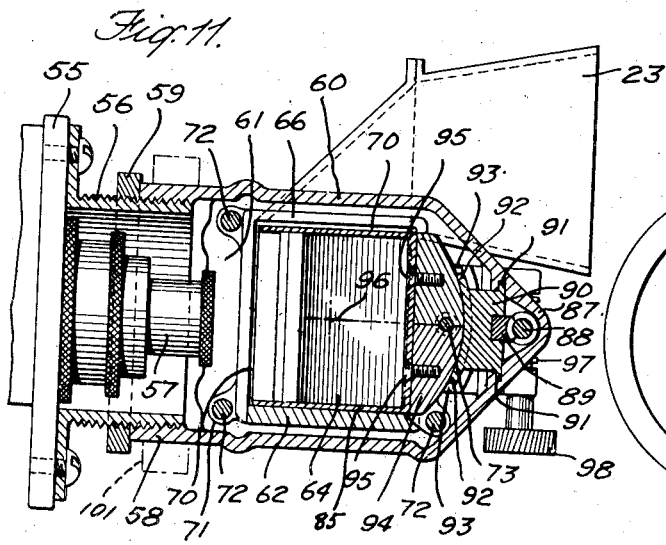
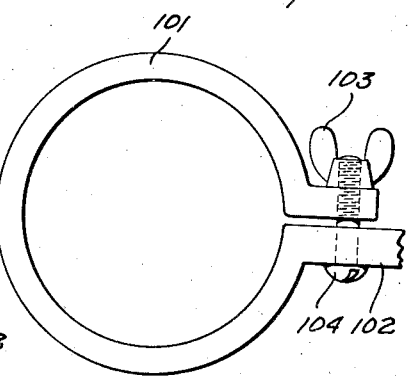
INVENTOR
INGVAR E. DE SHERBININ
BY
ATTORNEY Patented May 12, 1942

2,282,947

UNITED STATES PATENT OFFICE 2,282,947

STEREOSCOPIC PHOTOGRAPHY AND PROJECTION

Ingvar E. de Sherbinin, Mount Vernon, N. Y.

Application May 1, 1939, Serial No. 271,017

18 Claims. (Cl. 88—16.6)

This invention relates to photography and to the projection of images, and more particularly pertains to stereoscopic photography and projection, both still and cinematographic, with or without color.

The invention provides a novel optical system for stereoscopic photography and projection which can be applied readily to a camera or projector having one lens, and is capable of universal use with all cameras and projectors regardless of the focal length of the lens thereof. This optical system is contained in a suitable housing or casing designed for ready attachment to a camera or projector having one lens and will perform its function for the purpose intended regardless of whether the lens is "regular," "telephoto" or "wide angle."

The optical system and its casing are arranged so that in projection, by a simple adjustment of the casing with respect to the projector, the right and left eye images can be superimposed in correct registry and eye strain thus can be avoided. Additionally, in photography, the optical system is so arranged that the stereoscopic effect may be varied to obtain the correct effect for the existing conditions or an exaggerated effect if desired.

The nature of the invention together with its characteristic features and advantages will be apparent from the following description when considered in connection with the accompanying drawings forming a part thereof, and in which:

Fig. 1 is a diagrammatic perspective view illustrating the manner in which the optical system of the present invention is utilized for projection to obtain the stereoscopic effect;

Fig. 2 is a diagrammatic perspective view which illustrates the use of the same optical system with a camera employing only one lens, to obtain a double image for stereoscopic projection;

Fig. 10 is a horizontal sectional view of another form of optical system embodying the invention, which is arranged to provide variations of the stereoscopic effect;

Fig. 11 is a vertical sectional view taken on line 11—11 of Fig. 10, and

Fig. 12 is an elevational view of a bracket which is utilized to secure the attachment shown in Figs. 10 and 11 to a projector.

Like characters of reference designate the same or similar parts throughout the several views.

The optical system of the present invention employs three reflecting surfaces for each of the two separate bundles of light rays passing therethrough, with the result that the center lines of the bundles of light rays are parallel, thereby affording true stereoscopic effect and lessened eye-strain for the viewer. The optical system is used both for photography and projection and has two symmetrical portions or units, each of which reflects the light rays three times in passing therethrough. In projecting, a light polarizing material, such as "Polaroid," is used, the images being projected through the polarizing material and being received by the viewer through polarizing material so employed that separate images are received by each eye. Any other method or means may be employed which will provide a separate image for each eye. No polarizing material is required for the camera.

Figure 3:
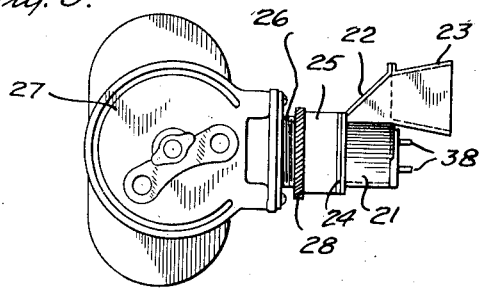
Fig. 3 is a side elevation of a moving picture camera employing only one lens and having an optical attachment embodying the present invention secured thereto.
Figure 5:
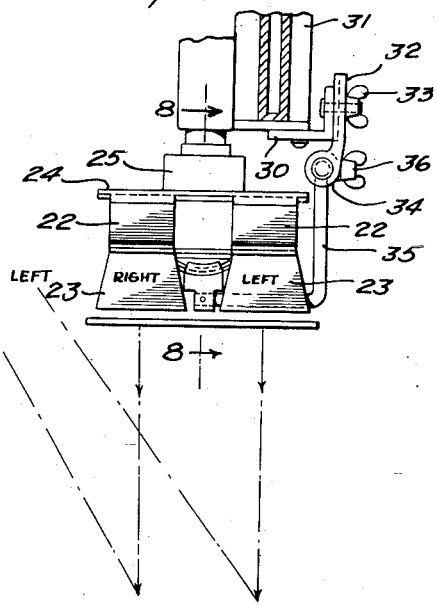
Fig. 5 is a top plan view of the projector shown in Fig. 4.
Figure 4:
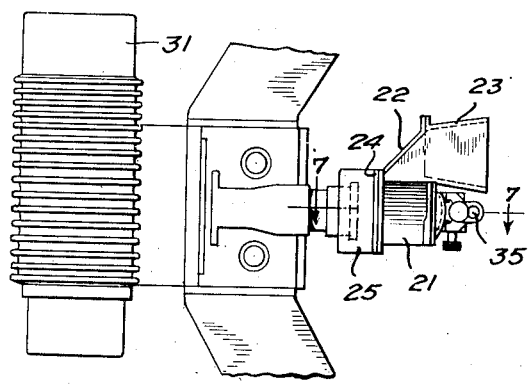
Fig. 4 is a side elevational view of a moving picture projector employing only one lens having the same attachment secured thereto.
Figure 6:
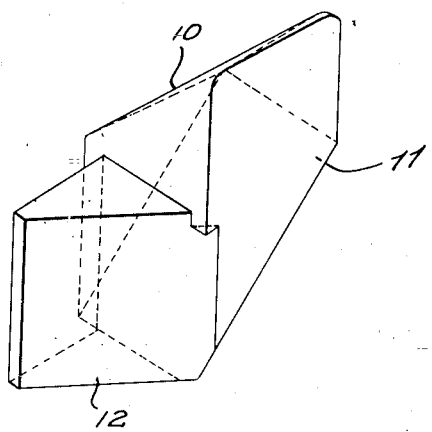
Fig. 6 is a perspective view of a three reflecting surface optical unit embodying the present invention.

Referring to Figs. 1, 2 and 6, each unit of the optical system has an outer reflecting surface 10, an intermediate reflecting surface 11, and an inner reflecting surface 12. In the form of optical unit shown in Figs. 1 and 6, the three reflecting surfaces are part of a single prism, while in the form shown in Fig. 2, the reflecting surfaces 10 and 11 are part of one prism and reflecting surface 12 is part of a separate prism. These two forms of optical units may be used interchangeably excepting in instances where it is desired to adjust the stereoscopic effect, in which event the form shown in Fig. 2 would be used, for reasons hereinafter to appear. Considering the optical units from the standpoint of photography as illustrated in Fig. 2, the outer reflecting surface 10 is a plane surface of rectangular configuration with its horizontal axis normal to the light rays from the object 13 and with its vertical axis inclined at an angle of about 45° to these rays. The intermediate plane reflecting surface 11 is disposed directly below the surface 10 and is also of rectangular configuration, with its horizontal axis normal to the light rays reflected from the surface 10 and with its vertical axis inclined at an angle of about 45° with the said reflected light rays from surface 10. Inner reflecting surface 12 is also a plane surface of rectangular configuration and is disposed laterally of the surfaces 10 and 11 in such position as to receive the light rays reflected from surface 11. The vertical axis of surface 12 is normal to the light rays reflected from surface 11 and the horizontal axis is disposed at an angle of approximately 45° to said rays. The optical units are made preferably of optical glass and are so formed that the points at which light rays enter and leave the unit or any constituent prism, are plane surfaces disposed normally to the light rays entering or leaving.

With this optical system, the center lines of the light rays from the object 13 to the reflecting surfaces 10 are parallel. In passing through the optical systems, each image is revolved 90° and after passing through the lens 14 of the camera, the images appear base to base on the film or plate 15, as shown in Fig. 2.

In projecting, the light rays from each image on the film or plate pass through the lens of the projector and are reflected by surface 12 (Fig. 1) to surface 11 and thence to surface 10 from which they pass out of the optical system toward the screen 16. The light rays for the left eye image are polarized by light polarizing material such as "Polaroid" 17, or the like, so that the resulting vibrations are in a vertical direction and the light rays for the right eye are polarized by the same material 18 but in such manner that the light rays thereafter vibrate in a horizontal direction, as clearly illustrated diagrammatically in Fig. 1. The images are reflected from screen 16 to the viewer who wears glasses of light polarizing material such as "Polaroid" or the like, having a left eye lens 19 arranged so as to transmit only vertical light vibrations and the right eye lens 20 arranged so as to transmit only horizontal light vibrations. In this manner the left eye will receive the left eye image only and the right eye will receive the right eye image only, thus providing the stereoscopic effect desired. It will be understood that the screen 16 is an aluminum or other metallic screen, or is of any other suitable material coated with aluminum paint.

Figs. 3 to 5 and 7 to 9 illustrate a preferred form of housing or casing for the optical system embodying the invention. In this instance the optical units or prisms are of the form shown in Figs. 1 and 6, although the form shown in Fig. 2 may be so housed. The casing includes a body portion 21 which is shaped to fit snugly the two optical units when they are placed side by side in proper position to function for the purpose intended. The casing has spaced upstanding portions 22 which parallel the reflecting surface 10 of each optical unit and to each of these upstanding portions there is attached a sun shade 23 which is of rectangular transverse cross-sectional configuration as shown particularly in Fig. 9, and which gradually converges inwardly to the optical unit. The open rear end of the body portion is closed by a cover 24 which is provided with a centrally disposed, outwardly extending cylindrical projection 25 having its outer end portion threaded internally to provide means by which the entire optical attachment may be removably secured to the externally threaded barrel 26 of the camera 27. The projection 25 may be knurled as indicated at 28 to facilitate the mounting of the attachment on the camera and its removal therefrom.

Additional means are provided to mount the optical attachment on a projector to permit the attachment to be swung free of the projector at will when adjustment is necessary. Also special means are utilized in conjunction with the mounting means to provide ready adjustment of the positions of the right and left eye images on the screen so that the two images may be superimposed on the screen in correct registry and thereby eliminate eye strain of the viewer. I have discovered that, with the optical system of my invention, both vertical and lateral adjustment of the position of the two images on the screen may be effected simply by movement of the optical attachment as a unit about vertical and horizontal axes with respect to the projector. The special means aforesaid functions to provide this adjustment of the images on the screen.

An angle bracket 30 secured to the front of the projector 31, provides the means by which the support for the optical attachment is secured to the projector. Removably fixed to the bracket 30 is a plate 32 which is secured in position by a thumb screw 33. The forward end of the plate 32 has a knuckle 34 which receives one end of a supporting rod 35 in such manner as to provide a hinged joint. A thumb screw 36 provides means by which the rod 35 and the attachment may be fixed in the desired position. Rod 35 is bent at a right angle in its mid-portion and its outer end is fixed to an image position adjusting device which is fixed to the lower front central portion of the optical attachment.

The image position adjusting device is removably secured to the optical attachment by means of thumb screws 37 which are threaded on studs 38 secured to the front of the housing or casing, in order that the device may be removed when the attachment is used with a camera. The adjusting device comprises essentially three cooperating parts, (1) a cup-shaped supporting member 39 which is fixed to the outer end of rod 35, (2) an intermediate member 40, and (3) a base member 41. Supporting member 39 has upper and lower arcuate grooves in the inner peripheral portions, the center of curvature of which is the intersection of the longitudinal and transverse axes of the optical attachment, designated 42 in Fig. 7. The arcuate grooves of member 39 receive in sliding relationship, upwardly and downwardly extending arcuate ribs 43 of intermediate member 40, the opposite sides of which are arcuate and move in arcuate grooves 44 (Fig. 9) on base member 41, the center of curvature of the ribs and the grooves 44 being on the horizontal axis 52 of the optical attachment. A worm 45 carried by supporting member 39 which is rotated by a thumb turn 46, and meshes with a gear segment 47 fixed on intermediate member 40, provides the means for moving the optical attachment about a vertical axis and adjusting the vertical positions of the right and left eye images on the screen.

Figure 7:
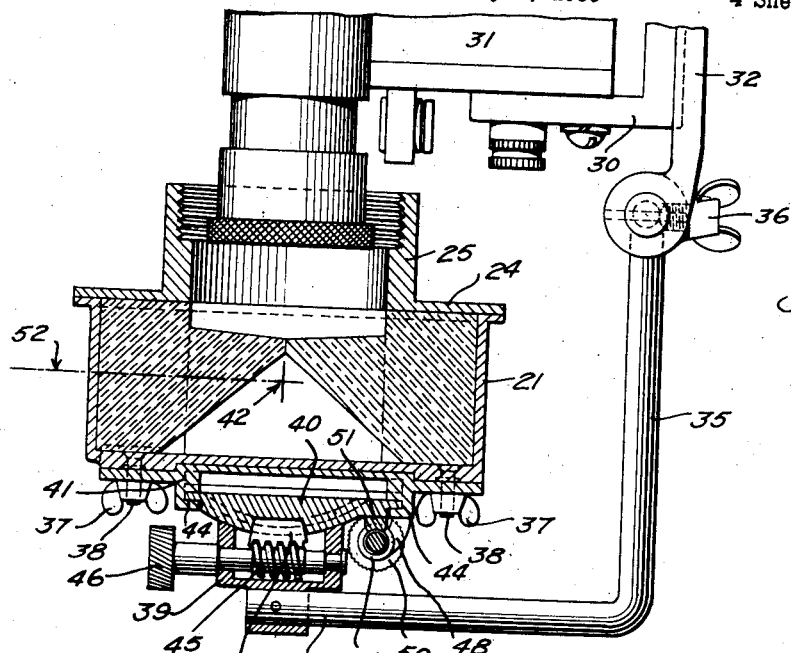
Fig. 7 is a sectional view taken on line 7—7 of Fig. 4, but on an enlarged scale.
Figure 9:
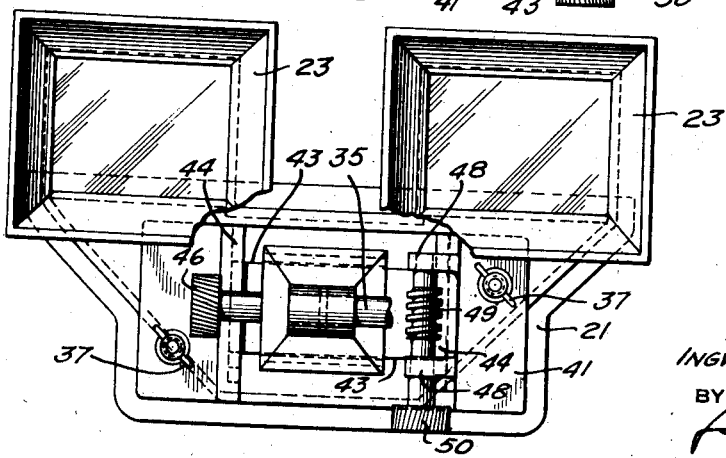
Fig. 9 is an elevational view of the right hand end of Fig. 8 with parts broken away to clarify the structure.

The right hand end portion of base member 41 as viewed in Figs. 7 and 9 has spaced bosses 48 in which is rotatably mounted a worm 49 which is rotated by a thumb turn 50. A gear segment 51, Fig. 7, on the corresponding end portion of the intermediate member 40, meshes with the worm 49, this worm and gear mechanism providing the means by which the optical attachment is oscillated about its horizontal axis to effect horizontal adjustment of the right and left eye images. Movement of worm 49 will result in movement of the attachment about a horizontal axis because the worm is fixed to the attachment through the base member 41 and the gear segment is fixed to the projector 31 through intermediate member 40, cup-shaped member 39, supporting rod 35, plate 32 and bracket 30. It will be understood that during movement of worm 49, the intermediate member 40 will be restrained from movement with respect to cup-shaped member 39 by the arcuate grooves which receive the ridges 43 and by the co-action of the worm 45 and gear segment 47 as previously described. The outer surface of gear segment 51 which engages the worm 49 will be convex, with a center of curvature lying on the horizontal axis 52 of the optical attachment.

The form of the invention illustrated in Figs. 10 and 11, includes means whereby the stereoscopic effect may be varied to obtain the correct effect for the existing condition or an exaggerated effect, if desired. The camera 55 has an externally threaded barrel 56 secured thereto so as to enclose part at least of the lens barrel 57, and onto which the optical attachment is threaded by means of the internally threaded cylindrical extension 58. A lock-nut 59 assures that the attachment will remain in the desired position upon the camera. The attachment has a supporting portion 60 provided with oppositely disposed openings 61 through which project the casing for the optical system. In this instance, the form of optical system shown in Fig. 2 is utilized, that is to say, with the prisms having reflecting surfaces 10 and 11 physically separate from the prisms having the reflecting surface 12. The casing for the optical system has a generally rectangular body portion 62, the outer surfaces of which are spaced from the inner surfaces of the supporting portion 60 so as to permit movement of the inner part 62 relative to the supporting portion 60. Prisms 63 and 64, each having a reflecting surface 12, are fixed in the body portion 62. Oppositely disposed extension members 65 and 66 are fixed to and project from the body portion 62 through the openings 61 in the supporting portion 60. Prisms 67 and 68 each having reflecting surfaces 10 and 11 as shown in Fig. 2, are fixed in housing members 69 and 70 respectively, which are longitudinally movable with respect to the extension members 65 and 66 respectively and into which they telescope. A sun shade 23 is fixed in position to the upper part of each housing member 69 and 70. The outer end of each extension member is provided with guides 71 through which pass rods 72, the outer ends of which are fixed to the outer end of each housing member. Any suitable means may be employed for moving the prism housing members inwardly and outwardly in their respective extension members 69 and 70. One means suitable for the purpose is the bolt 73 shown, having a reduced middle portion which is received in an aperture in member 94 which is fixed to or may be integral with, the forward part of the body portion 62. Opposite end portions of the bolt, oppositely threaded, are rotatable in nuts 75 and 76, one of which is fixed to the front portion of the inner end of each housing member 69 and 70. One end of bolt 73 is provided with a thumb turn 77 by means of which the bolt is turned and the prisms 67 and 68 are moved toward and away from the prisms 63 and 64 to adjust the stereoscopic effect. The openings 61 in the supporting portion 60 are of sufficient extent to permit the housing for the optical system to be moved about its vertical and horizontal axes. In photography, movement of the housing and its optical system about a horizontal axis with respect to the camera lens, provides correct framing of the images projected on the film to obtain correct stereoscopic effect. This adjustment will be used principally when the object is closer than normal views. In projection, movement of the housing and its optical system about horizontal and vertical axes will provide correct registry of the right and left eye images on the screen.

As shown, the front central part of the supporting portion 60 has a closed forward end 87 which carries worm 88, which meshes with a gear segment 89 fixed on a laterally movable intermediate member 90 having upper and lower arcuate ridges 91 which are received in corresponding grooves in the end portion 87. Member 90 also has laterally extending arcuate flanges 92 which are received in corresponding grooves 93 in a two-part member 94 which is fixed to the front of the housing 85 by screws 95 or the like. The center of curvature of the ridges 91 and the grooves in which they move, is at the intersection 96 of the horizontal and vertical axes of the optical attachment, and the centers of curvature of the flanges 92 lie on the horizontal axis which passes through intersection 96, whereby the optical system will be movable about horizontal and vertical axes to adjust the positions of the right and left eye images as hereinabove described. A worm 97 which is operated by thumb turn 98 and is disposed with its axis vertical and is mounted for operation in the end portion 87, meshes with and moves a worm gear segment 99 on the right hand end portion, as viewed from the right of Fig. 11, of the inner member 94. With this arrangement, it will be percieved that movement of worm 88 by thumb turn 100 will move the optical system about a vertical axis, and movement of the worm 97 by thumb turn 98 will move the optical system about a horizontal axis.

Figure 8:
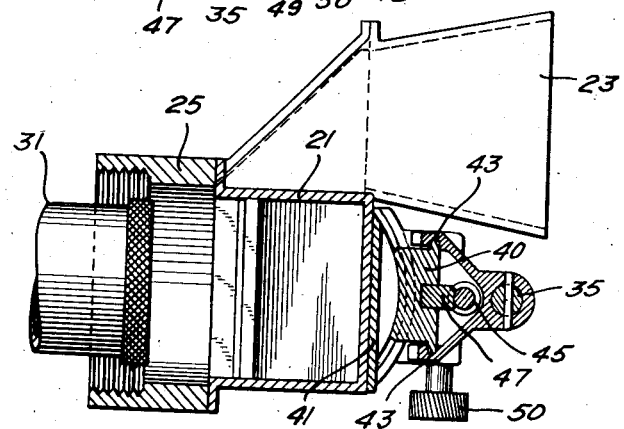
Fig. 8 is a vertical sectional view taken on line 8—8 of Fig. 5, but on an enlarged scale.

When it is desired to utilize the form of optical attachment shown in Figs. 10 and 11 with a projector, the inner end of the cylindrical extension 58 is inserted in a circular bracket 101, such as shown in Fig. 12, which may be mounted on, or form part of, a supporting rod 102 similar to rod 35, the other end of which is fixed to the projector, the arrangement being such that the attachment may be swung free of the projector when desired as in the form of the invention shown in Figs. 7, 8 and 9. A wing nut 103 on bolt 104 is utilized to contract, and permit expansion of, the bracket 98.

From the foregoing it will be perceived that the invention provides an optical system and an optical attachment which may be used with a one lens camera or projector, whether still or motion picture, irrespective of the focal length of the lens of the camera or projector or whether the lens is of the regular, telephoto, or wide-angle type. Otherwise expressed, the optical system and the optical attachment of the present invention is capable of universal adaptability without any adjustment of the system other than the mounting of the system or the attachment on the camera or projector. By reason of the fact that the optical system of the invention employs three reflecting surfaces for each image and these three reflecting surfaces are arranged so that each image is rotated through an angle of 90° in being conveyed from the object to the lens, the "center line of sight" of both the left and right eye images 105 and 106 respectively, Fig. 2, normally are parallel to the "center line of sight" or the axis 107 of the lens of the camera, with each aperture of the optical system receiving a full view of the object, whereby true stereoscopic effect is obtained and eye-strain for the viewer is lessened. This result would not be achieved if less than three reflecting surfaces were employed in the optical system for the reason that the center lines of sight of the two images then would have to converge in order that both apertures of the optical system would receive a full view of the object. With such a system true stereoscopic effect would not be obtained and eye-strain of the viewer would be increased.

Inasmuch as the forms of the invention herein disclosed are preferred forms, it will be understood that changes may be made in the form, location and relative arrangement of the several parts thereof without departing from the principles of the invention, and that the invention is not to be limited excepting by the scope of the appended claims.

What is claimed is:

1. An optical attachment for stereoscopic photography and projection for use with a cinematographic apparatus having one lens, comprising a casing having a substantially centrally disposed aperture at the rear of the casing and double opposed apertures at the front of the casing, two optical units in the casing adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, a support for the casing secured to the apparatus, means for movably securing the casing to the support with the rear aperture adjacent to and in alignment with the lens of the apparatus, said means comprising an intermediate supporting member on the support and movable about a vertical axis with respect to the support and a base member on the intermediate member and fixed to the casing and movable about a horizontal axis with respect to the intermediate supporting member, means for moving the intermediate supporting member with respect to the support, and means for moving the base member with respect to the intermediate supporting member, the arrangement being such that movement of the intermediate supporting member will move the casing about a vertical axis and thereby will effect vertical adjustment of the images, and movement of the base member with respect to the intermediate member will move the casing about a horizontal axis and thereby will effect horizontal adjustment of the images.

2. An optical attachment for stereoscopic photography and projection for use with a cinematographic apparatus having one lens, comprising a casing having a substantially centrally disposed aperture at the rear of the casing and double opposed apertures at the front of the casing, two optical units in the casing, each unit being disposed to convey an image through the casing from one aperture to another, each of said units having three plane reflecting surfaces arranged to rotate the image approximately 90° in being conveyed through the unit, a support for the casing secured to the apparatus, means for movably securing the casing to the support with the rear aperture adjacent to and in alignment with the lens of the apparatus, said means comprising an intermediate supporting member on the support and having sliding movement about a vertical axis with respect to the support and a base member on the intermediate member and fixed to the casing and having sliding movement about a horizontal axis with respect to the intermediate supporting member, worm and gear means for moving the intermediate supporting member with respect to the support, and separate worm and gear means for moving the base member with respect to the intermediate supporting member, the arrangement being such that movement of the intermediate supporting member will move the casing about a vertical axis and thereby will effect vertical adjustment of the images, and movement of the base member with respect to the intermediate member will move the casing about a horizontal axis and thereby will effect horizontal adjustment of the images.

3. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, and means for moving the casing about an axis disposed at an angle to the axis of said lens to effect adjustment of the images.

4. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, and means for moving the casing about an axis disposed substantially at right angles to the axis of said lens to effect adjustment of the images.

5. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, and means for moving the casing about a substantially vertical axis disposed approximately at right angles to the axis of said lens to effect vertical adjustment of the images.

6. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, and means for moving the casing about a substantially horizontal axis disposed approximately at right angles to the axis of said lens to effect horizontal adjustment of the images.

7. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, and means for moving the casing about axes disposed substantially at right angles to each other and substantially at right angles to the axis of said lens to effect adjustment of the images in directions at right angles to each other.

8. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, and means for moving the casing about a substantially vertical axis and about a substantially horizontal axis, both axes being disposed substantially at right angles to the axis of said lens, to effect vertical and horizontal adjustment respectively of the images.

9. An optical attachment for stereoscopic photography and projection for use with a cinematographic apparatus having one lens, comprising a casing having a substantially centrally disposed aperture at the rear of the casing and double opposed apertures at the front of the casing, an optical system in the casing having separate optical units adapted to be located at opposite sides of and equidistantly from the optical axis of said lens, each unit being disposed to convey an image through the casing from one aperture to another, each of said units having three plane reflecting surfaces arranged to rotate the image approximately 90° in being conveyed through the unit, means for movably supporting the casing on the apparatus with the rear aperture adjacent to and in alignment with said lens, said means being constructed and arranged to permit the casing to be moved to a position with the rear aperture thereof out of alignment with said lens, and means for moving the casing about an axis disposed at an angle to the axis of said lens to effect adjustment of the images.

10. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving said optical units simultaneously as a unit about an axis disposed at an angle to the axis of said lens to effect adjustment of the images.

11. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving said optical units simultaneously as a unit about an axis disposed substantially at right angles to the axis of said lens to effect adjustment of the images.

12. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving said optical units simultaneously as a unit about a substantially vertical axis disposed approximately at right angles to the axis of said lens to effect vertical adjustment of the images.

13. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving said optical units simultaneously as a unit about a substantially horizontal axis disposed approximately at right angles to the axis of said lens to effect horizontal adjustment of the images.

14. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving said optical units simultaneously as a unit about axes disposed substantially at right angles to each other and substantially at right angles to the axis of said lens to effect adjustment of the images in directions at right angles to each other.

15. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving said optical units simultaneously as a unit about a substantially vertical axis and about a substantially horizontal axis, both axes being disposed substantially at right angles to the axis of said lens, to effect vertical and horizontal adjustment respectively of the images.

16. An optical attachment for stereoscopic photography and projection for use with a cinematographic apparatus having one lens, comprising an optical system having separate symmetrically arranged optical units adapted to be located at opposite sides of and equidistantly from the optical axis of said lens, each unit having three plane reflecting surfaces, the first reflecting surface of each unit being arranged to be disposed with its normal at an acute angle to the axis of the lens of the apparatus to reflect the image transmitted toward or from the lens substantially at right angles, the second reflecting surface of each unit being disposed with its normal at an acute angle to the axis of the beam transmitting the image from the first reflecting surface and lying in a plane at right angles to the plane of the axis of the beam transmitted to and reflected from the first reflecting surface, and so that the transmitted beam is reflected substantially at right angles with its axis in said first mentioned plane, and the third reflecting surface of each unit being disposed with its normal at an acute angle to the axis of the beam reflected from the second reflecting surface and lying in a third plane substantially at right angles to said first mentioned plane and so that the transmitted beam is reflected substantially at right angles with its axis in said third plane, the arrangement of the reflecting surfaces being such that the image is rotated approximately 90° while being conveyed through the system, and means for moving the second and third reflecting surfaces of both units simultaneously toward and away from the first reflecting surfaces thereof lineally in a direction at right angles to the axis of said lens to vary the stereoscopic effect.

17. An optical attachment for stereoscopic photography and projection for use with a cinematographic apparatus having one lens, comprising an optical system having separate symmetrically arranged optical units adapted to be located at opposite sides of and equidistantly from the optical axis of said lens, each unit having three plane reflecting surfaces, the first reflecting surface of each unit being arranged to be disposed with its normal at an acute angle to the axis of the lens of the apparatus to reflect the image transmitted toward or from the lens substantially at right angles, the second reflecting surface of each unit being disposed with its normal at an acute angle to the axis of the beam transmitting the image from the first reflecting surface and lying in a plane at right angles to the plane of the axis of the beam transmitted to and reflected from the first reflecting surface, and so that the transmitted beam is reflected substantially at right angles with its axis in said first mentioned plane, and the third reflecting surface of each unit being disposed with its normal at an acute angle to the axis of the beam reflected from the second reflecting surface and lying in a third plane substantially at right angles to said first mentioned plane and so that the transmitted beam is reflected substantially at right angles with its axis in said third plane, the arrangement of the reflecting surfaces being such that the image is rotated approximately 90° while being conveyed through the system, means for moving the second and third reflecting surfaces of both units simultaneously toward and away from the first reflecting surfaces thereof lineally in a direction at right angles to the axis of said lens to vary the stereoscopic effect, and means for moving said optical units simultaneously as a unit about an axis disposed at an angle to the axis of said lens to effect adjustment of the images.

18. An optical attachment for stereoscopic photography and projection for use with a cinematographic apparatus having one lens, comprising an optical system having separate optical units adapted to be located at opposite sides of and equidistantly from the optical axis of said lens, each unit having three plane reflecting surfaces arranged to rotate the image approximately 90° in being conveyed through the unit, means for movably supporting the optical units on the apparatus adjacent to said lens so as to convey an image through each unit to and from said lens, and means for moving the second and third reflecting surfaces of each unit which are optically more remote from said lens simultaneously toward and away from the first reflecting surfaces of each unit lineally in a direction substantially at right angles to the axis of said lens to vary the stereoscopic effect.

INGVAR E. DE SHERBININ.